United States Patent [19]

Rogers, Jr. et al.

[11] 4,165,034

[45] Aug. 21, 1979

[54] FLUID MIXING VALVE CONSTRUCTION AND METHOD OF MAKING THE SAME

[75] Inventors: Arden D. Rogers, Jr.; Clifford E. Goff, both of Knoxville, Tenn.

[73] Assignee: Robertshaw Controls Company, Richmond, Va.

[21] Appl. No.: 872,065

[22] Filed: Jan. 25, 1978

Related U.S. Application Data

[62] Division of Ser. No. 736,763, Oct. 29, 1976, Pat. No. 4,082,219.

[51] Int. Cl.² .............................................. G05D 23/12
[52] U.S. Cl. ..................................... 236/12 R; 137/75; 236/99 E
[58] Field of Search ................. 236/12 R, 99 E, 93 B; 137/75; 239/75

[56] References Cited

U.S. PATENT DOCUMENTS

| | | | |
|---|---|---|---|
| 2,396,053 | 3/1946 | McEntire | 236/12 R X |
| 2,511,042 | 6/1950 | Branson | 236/99 E |
| 3,036,777 | 5/1962 | Budde | 236/12 R |
| 3,105,375 | 10/1963 | Eskin et al. | 236/12 R X |
| 3,273,796 | 9/1966 | Bauerlein | 236/93 X |
| 3,768,731 | 10/1973 | Lavado | 236/34.5 X |
| 3,994,269 | 11/1976 | Takaoka et al. | 123/117 A |

Primary Examiner—William F. O'Dea
Assistant Examiner—William E. Tapolcai, Jr.
Attorney, Agent, or Firm—Candor, Candor & Tassone

[57] ABSTRACT

A fluid mixing valve construction having a housing provided with a pair of inlets respectively interconnected by a pair of valve seats to an outlet and with a valve member operated by a condition responsive unit for controlling the valve seats in accordance with the condition of fluid passing to the outlet and sensed by the condition responsive unit. A second condition responsive unit is operatively interconnected to the valve member to close one of the valve seats with the valve member if the first mentioned condition responsive unit does not close the one valve seat with the valve member even though the same is sensing a condition that would require the first mentioned condition responsive unit to close the one valve seat whereby the fluid mixing valve construction is substantially fail-safe.

4 Claims, 7 Drawing Figures

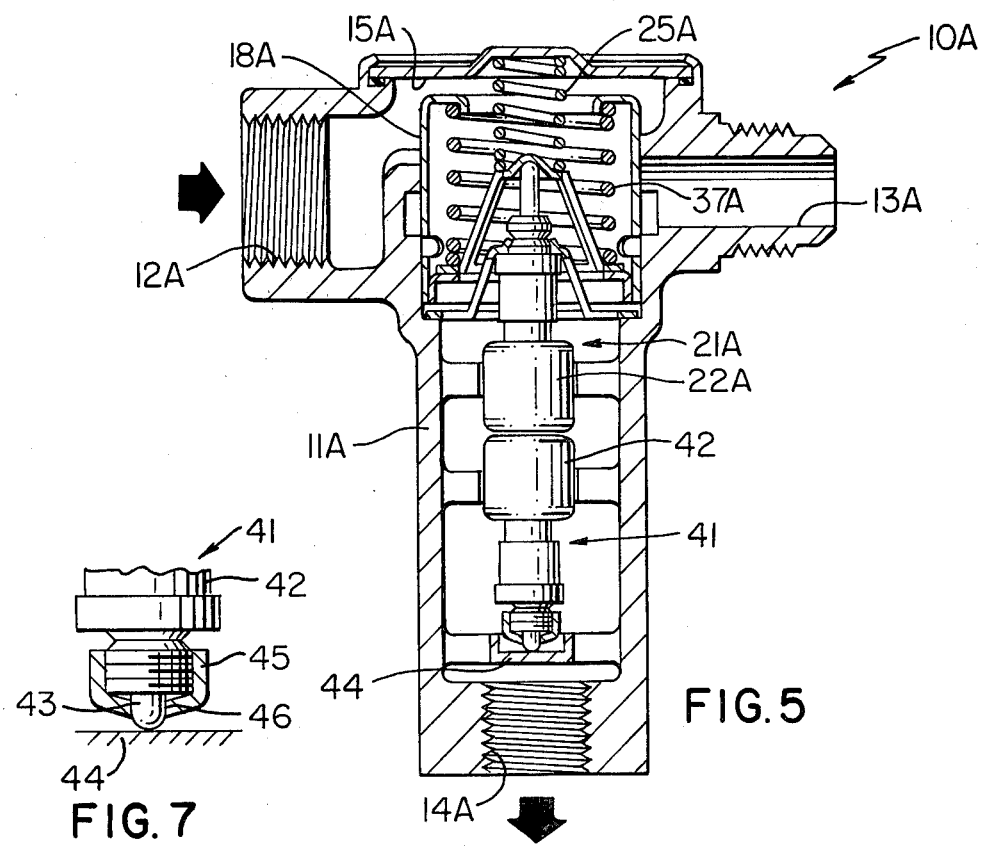
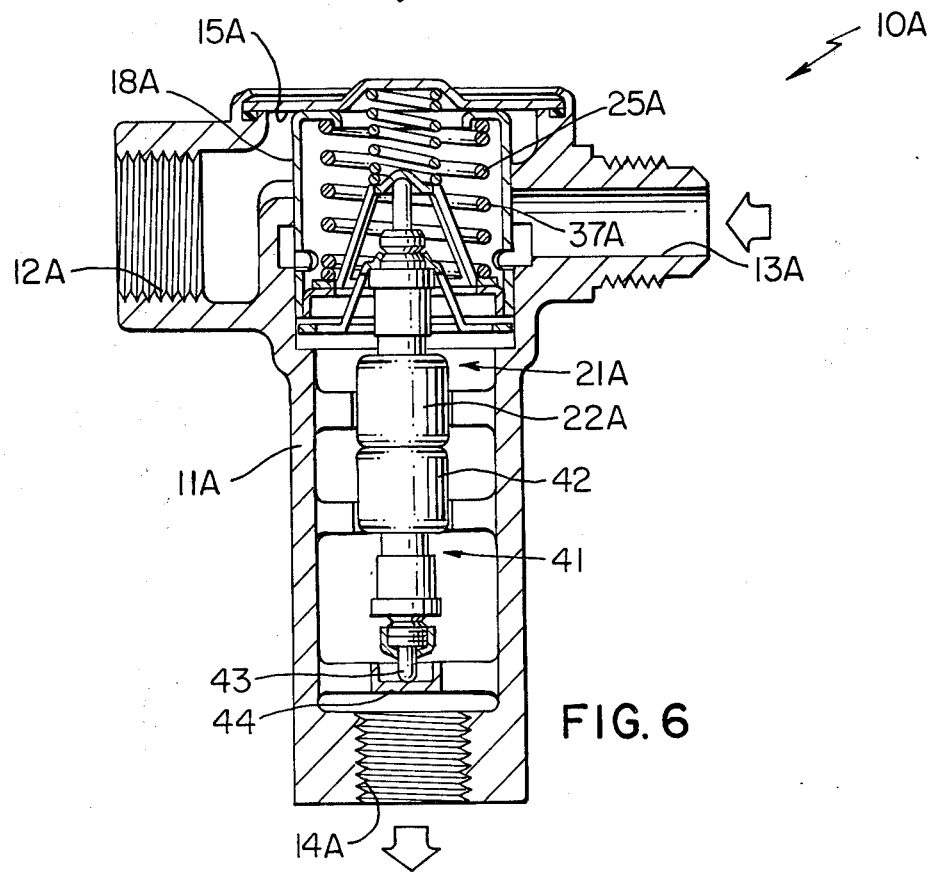
FIG. 5
FIG. 7
FIG. 6

FLUID MIXING VALVE CONSTRUCTION AND METHOD OF MAKING THE SAME

This application is a divisional patent application of its copending parent patent application, Ser. No. 736,763, filed Oct. 29, 1976, now U.S. Pat. No. 4,082,219.

This invention relates to an improved fluid mixing valve construction and to a method of making the same.

It is well known that fluid mixing valve constructions, such as hot and cold water mixing valve constructions, each has a housing means provided with a pair of inlets respectively being adapted to be interconnected to a hot water source and a cold water source and respectively being interconnected by a pair of valve seats to an outlet of the mixing valve construction, the mixing valve construction having a movable valve member means operated by condition responsive means for controlling the valve seats in accordance with the condition of the fluid passing to the outlet and sensed by the condition responsive means whereby in a water mixing valve construction, the water leaving the outlet is maintained at a predetermined temperature.

It is a feature of this invention to provide a fluid mixing valve construction of the above type wherein the same has means for closing off one of the inlets should the condition responsive means thereof fail whereby in a water mixing valve construction, the inlet for the hot water would be closed to prevent a scalding condition at the outlet should the main condition responsive means fail.

In particular, one embodiment of this invention provides a fluid mixing valve construction having a housing means provided with a pair of inlets which are respectively interconnected by a pair of valve seats to an outlet and with valve member means operated by condition responsive means for controlling the valve seats in accordance with the condition of the fluid passing through the outlet and sensed by the condition responsive means. A second condition responsive means is operatively interconnected to the valve member means to close one of the valve seats with the valve member means if the first mentioned condition responsive means does not close the one valve seat with the valve member means even though the same is sensing a condition that would require the first mentioned condition responsive means to close the one valve seat.

In one embodiment of this invention, the second condition responsive means comprises a condition responsive unit similar to the first mentioned condition responsive unit of the fluid mixing valve construction, and in other embodiments of this invention, the second condition responsive means comprises a fusible metallic securing means that is rendered inoperative for its securing function when sensing the condition that should normally cause the first-mentioned condition responsive means to close the one valve seat.

Accordingly, it is an object of this invention to provide an improved fluid mixing valve construction having one or more of the novel features of this invention as set forth above or hereinafter shown or described.

Another object of this invention is to provide an improved method of making such a fluid mixing valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

FIG. 5 is a view similar to FIG. 1 and illustrates another embodiment of the fluid mixing valve construction of this invention.

FIG. 6 is a view similar to FIG. 5 and illustrates the fluid mixing valve construction of FIG. 5 in a fail-safe condition thereof.

FIG. 7 is an enlarged, fragmentary cross-sectional view of part of the fluid mixing valve construction of FIG. 5.

Figure 1:
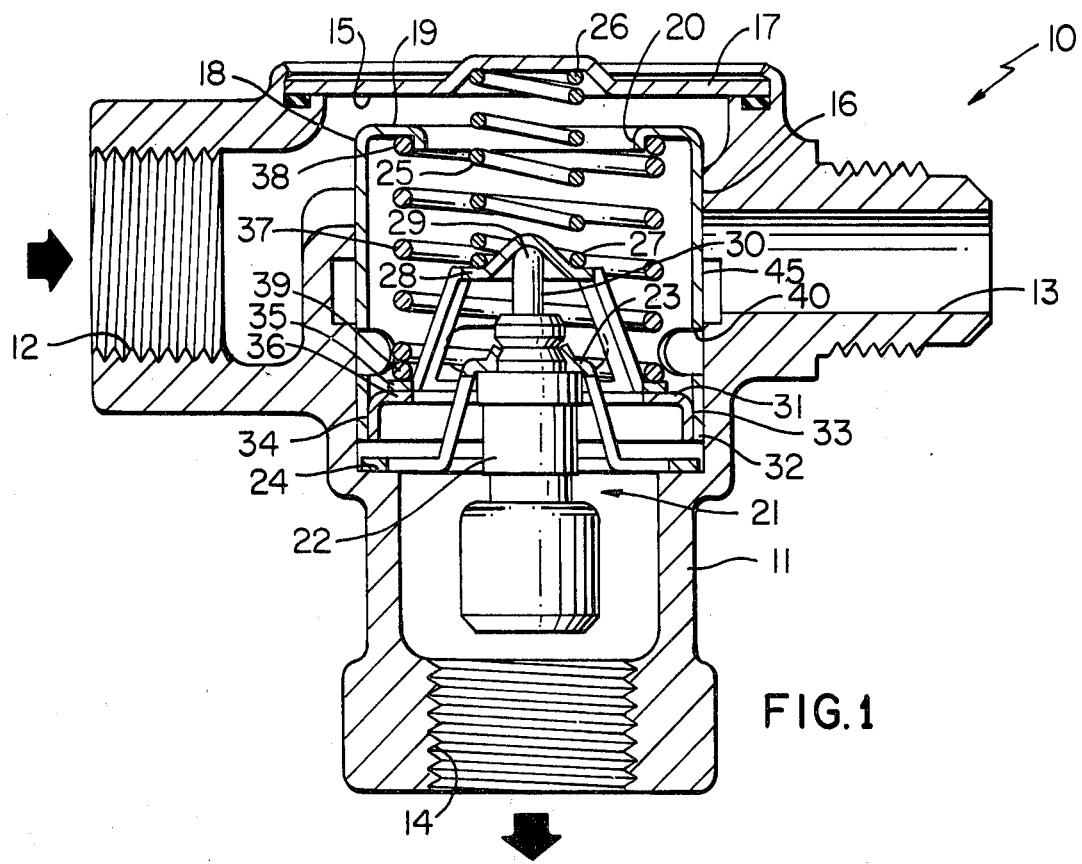
FIG. 1 is a cross-sectional view of an improved fluid mixing valve construction of this invention.
Figure 2:
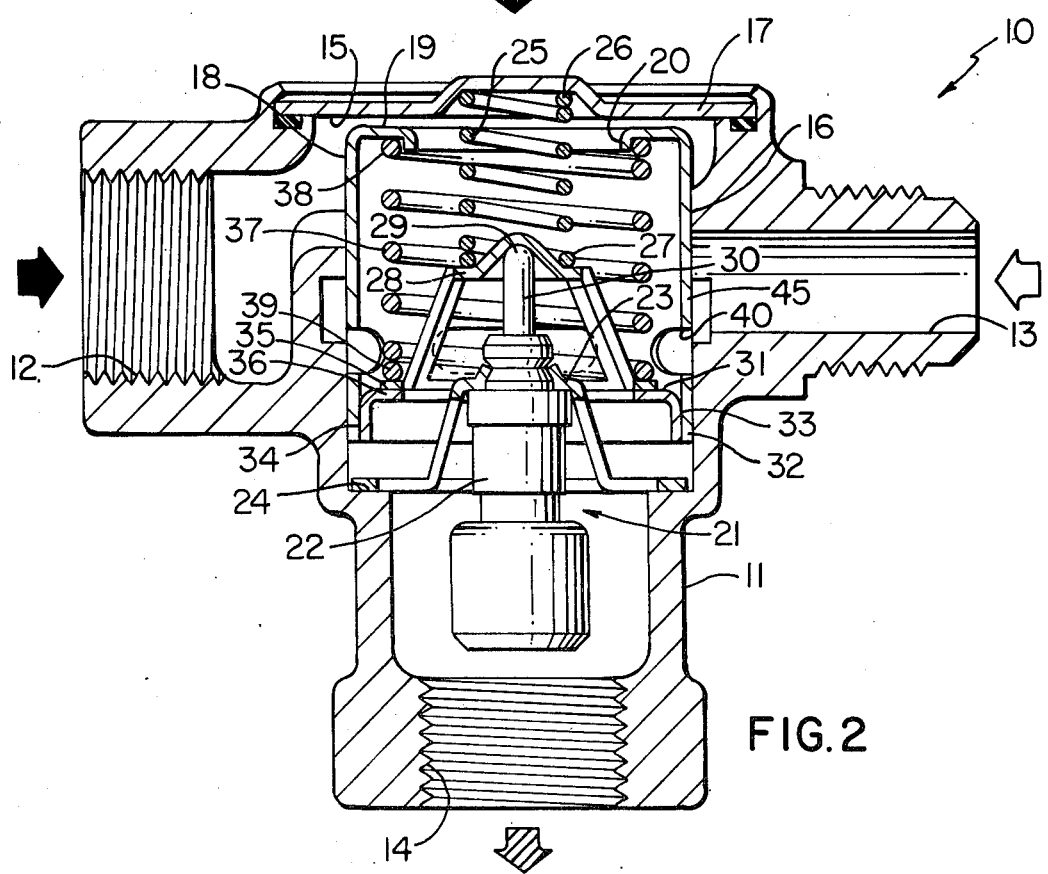
FIG. 2 is a view similar to FIG. 1 and illustrates the fluid mixing valve construction of FIG. 1 in another operating condition thereof.

While the various features of this invention are hereinafter described and illustrated as being particularly adapted to provide a water mixing valve construction, it is to be understood that the various features of this invention can be utilized singly or in any combination thereof to provide a mixing valve construction for any desired fluid.

Therefore, this invention is not to be limited to only the embodiments illustrated in the drawings, because the drawings are merely utilized to illustrate one of the wide variety of uses of this invention.

Referring now to FIGS. 1–4, one embodiment of the fluid mixing valve construction of this invention is generally indicated by the reference numeral 10 and comprises a housing means 11 having a pair of inlets 12 and 13 respectively being adapted to be interconnected to an outlet 14 by a pair of valve seats 15 and 16 of the housing means 11, the valve seat 15 comprising a substantially flat end closure 17 of the housing means 11 while the valve seat 16 comprises a substantially flat annular surface of the housing means 11 that surrounds the inlet 13.

A substantially cylindrical sleeve valve member 18 is movably mounted in the housing means 11 and is provided with an end surface 19 having a central opening 20 passing therethrough in such a manner that fluid from the inlet 12 is adapted to flow past the spacing between the flat valve seat surface 15 and the end 19 of the valve member 18 into the opening 20 thereof and down through the sleeve valve member 18 to the outlet 14. However, when the sleeve valve member 18 has its end surface 19 placed against the valve seat surface 15 in the manner illustrated in FIGS. 3 and 4, all fluid from the inlet 12 is completely blocked off by the closed valve seat 15 so that fluid from the inlet 12 cannot pass to the outlet 14 for a purpose hereinafter described.

A condition responsive unit that is generally indicated by the reference numeral 21 is carried by the housing means 11 to control movement of the valve member 18 as will be apparent hereinafter, the condition responsive unit 21 comprising a cylinder means 22 having a bracket 23 fastened thereto and resting on a shoulder 24 of the housing means 11 and normally being maintained against the shoulder means 24 by a compression spring 25 having one end 26 bearing against the valve seat member 15 and the other end 27 thereof bearing against a spring retainer 28 that engages against the end 29 of a piston member 30 of the piston and cylinder unit 21. Such a condition responsive unit 21 is well known in the art whereby further details of the structure of the unit 21 is not necessary as it is well known that the piston 30 will extend out of the cylinder 22 upon an increase in sensed temperature above a certain temperature and will retract into the cylinder 22 upon a decrease in temperature from a temperature above the certain temperature rating of the unit 21.

The sleeve valve member 18 has a spring retainer or part 31 disposed inside the same at the lower end 32 thereof and being secured to the internal peripheral surface 33 thereof by a fusible metallic securing means 34 that will melt when sensing a certain temperature and thereby render itself inoperative to secure the spring retaining part 31 to the valve part 18 as will be apparent hereinafter.

For example, when the mixing valve construction 10 of this invention is utilized for mixing hot water at the inlet 12 with cold water at the inlet 13 to provide mixed water at a certain temperature at the outlet 14, the fusible metallic securing means 34 can be selected to be of the type that will melt at approximately 160° F. for a purpose hereinafter described so that should the temperature of the mixed water passing through the valve member 18 to the outlet 14 exceed approximately 160° F., the securing solder-like material 34 will melt and thereby permit the parts 31 and 18 to be separated from each other as will be apparent hereinafter, such fusible metallic securing means 34 can comprise Neylo No. 158 sold by Ney Metals, Inc. of Brooklyn, N.Y.

The spring retainer 28 has its lower end 35 adapted to bear against an inwardly turned annular flange 36 of the spring retainer 31 and is normally maintained against such flange 36 by the force of an overrun compression spring 37 that is disposed in compressed relation inside the sleeve valve member 18 by having one end 38 thereof bearing against the inside of the end 19 of the sleeve 18 and the other end 39 thereof bearing against the lower end 35 of the spring retainer 28 whereby the spring retainer 28 normally remains in the condition illustrated in FIG. 1 during the up and down movement of the piston 30 relative to the cylinder 22 of the condition responsive unit 21 due to the expansion and contraction of a wax charge or the like disposed in the cylinder 22 and sensing the temperature of the water passing to the outlet 14 in a manner well known in the art.

Thus, it can be seen that the fluid mixing valve construction 10 of this invention can be made by the method of this invention from a relatively few parts to operate in a unique manner now to be described.

Assuming that no fluid is passing through the water mixing valve construction 10 so that the temperature being sensed by the condition responsive means 21 is below the temperature rating of the unit 21, which in a typical example of the unit 21 is approximately 155° F., the condition responsive unit 21 is in the condition illustrated in FIG. 1 whereby the sleeve valve member 18 is in its greatest down position. Thus, the valve seat 15 is in its fully opened condition and the valve seat 16 for the inlet 13 is completely closed off by the sleeve valve member 18 as an opening 40 in the side wall 45 of the sleeve valve member 18 is disposed spaced from the inlet 13 as illustrated in FIG. 1. Accordingly, upon initially directing hot and cold fluid to the inlets 12 and 13, only the hot fluid from the inlet 12 will pass through the fully opened valve seat 15 to the outlet 14 as the cold fluid at the inlet 13 is completely blocked by the sleeve valve member 18 closing the valve seat 16.

However, as the temperature of the fluid in the outlet 14 increases to approximately 155° F., the condition responsive means 21 senses the increased temperature and causes the piston 30 to move upwardly and carry the sleeve valve member 18 thereof to progressively close the valve seat 15 while progressively opening the valve seat 16 to thereby cause a mixing of the hot and cold fluid from the inlets 12 and 13 before the same pass through the valve member 18 to the outlet 14 in an attempt to maintain the temperature of the fluid at the outlet 14 at approximately 155° F.

Figure 3:
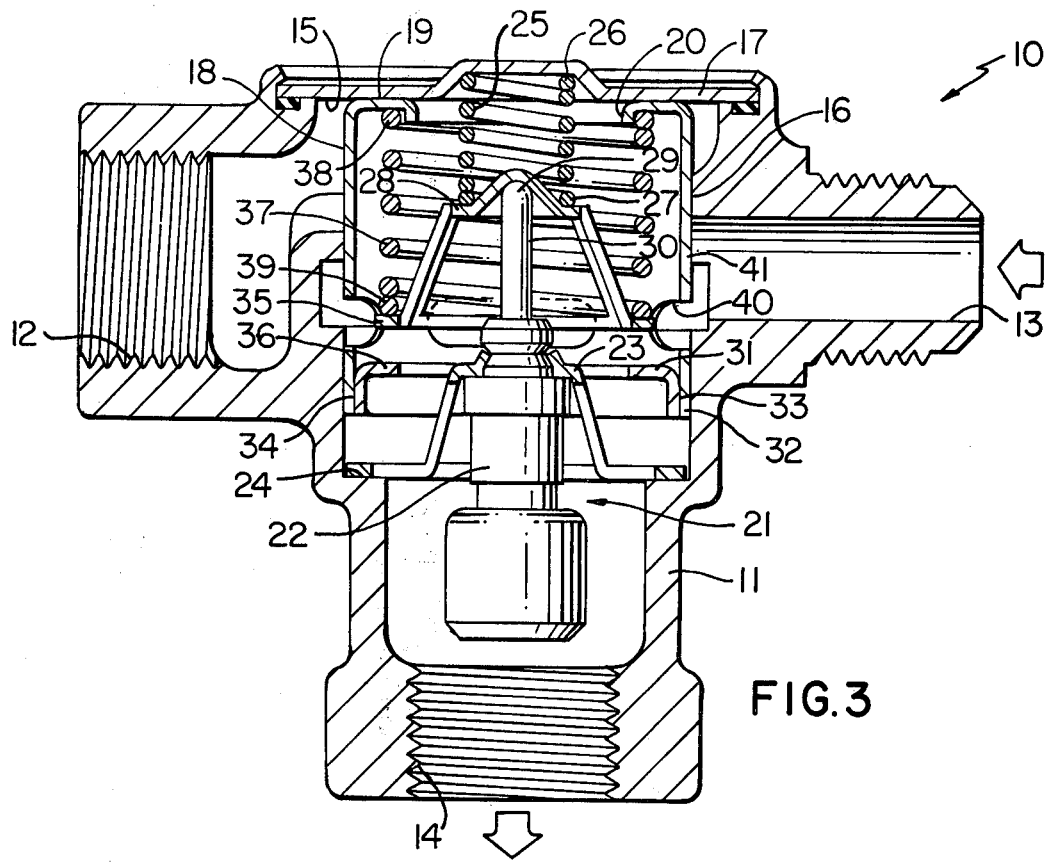
FIG. 3 is a view similar to FIG. 1 and illustrates the fluid mixing valve construction of FIG. 1 in overrun condition thereof.

Should the temperature of the water at the outlet 14 increase beyond 155° F., the condition responsive unit 21 is so constructed and arranged that the same will cause a complete closing of the valve seat 15 by the sleeve valve member 18 in the manner illustrated in FIG. 3 to completely close off the hot water inlet 12 from the outlet 14 and fully open the valve seat 16 for the cold water inlet 13 to thereby prevent the temperature of the water leaving the outlet 14 from exceeding approximately 155° F.

During the closing of the valve seat 15 in the manner illustrated in FIG. 3, should the condition responsive means 21 overrun and thereby cause the piston 30 to move a distance upwardly relative to the cylinder 22 beyond a distance necessary to close the end 19 of the sleeve valve member 18 against the valve seat 16 as illustrated in FIG. 3, such overrun or overshoot of the condition responsive means 21 causes the spring retainer 28 to move upwardly with the piston 30 and lift its end 35 off of the flange 36 of the secured spring retainer 31 and further compress the overrun spring 37 to take up the overshoot of the piston 30 of the condition responsive unit 21 whereby no damage to the construction 10 can take place.

With the fluid mixing valve construction 10 in the condition illustrated in FIG. 3, it can be seen that only cold water now passes to the outlet 14 as the hot water inlet 12 is completely closed off whereby the temperature of the fluid in the outlet 14 now falls below the 155° F. limit so that the cooling of the unit 21 causes the piston 30 to retract into the cylinder 22 and thereby permit the overrun spring 37 to move the bracket 23 back against the flange 36 of the secured spring retainer 31. Thus, the spring 25 can subsequently move the sleeve valve member 13 downwardly away from the valve seat 15 to again provide for mixing of the hot and cold fluids in the manner previously described.

Thus, it can be seen that the valve member 18 under the control of the condition responsive means 21 will tend to maintain the temperature of the fluids at the outlet 14 at approximately 155° F. if the temperature of the hot water entering the inlet 12 is in excess of 155° F. whereby a scalding condition will be prevented at the outlet 14 by the condition responsive means 21.

However, should the condition responsive means 21 fail so that the same does not close the valve member 18 against the valve seat 15 should the temperature of the fluid passing to the outlet 14 exceed 155° F., whereby the temperature of the fluid passing to the outlet 14 increases to approximately 160° F., the second condition responsive means 34 of the mixing valve construction 10 will now sense that the temperature of the water at the outlet 14 is 160° F. Thus, the fusible metallic securing means 34 will melt and thereby be rendered inoperative so that the part 31 becomes unsecured from the remainder of the sleeve valve member 18. At this time, the force of the stored energy in the compressed over-run spring 37 drives the valve member 18 upwardly relative to the unsecured spring retainer 31 in the manner illustrated in FIG. 4 to place the end 19 of the sleeve valve member 18 fully against the valve seat 15 to close the valve seat 15 and, thus, close the hot water inlet 12 from the outlet 14 and thereby prevent the temperature of the water passing out of the outlet 14 from ever exceeding approximately 160° F.

In order to prevent the fusible metallic sensing means 34 from being prematurely activated by temporary over temperature conditions, the housing means 11 has an annular groove 11' therein adjacent the sleeve 18 and communicating with the cold water inlet 13 whereby the cold water in the groove 11' prevents the fusible means 34 from immediately being activated when the valve construction temporarily moves to the position of FIG. 1, the cold water in the groove 11' thus acting as a time lag for the fusible means 34.

Figure 4:
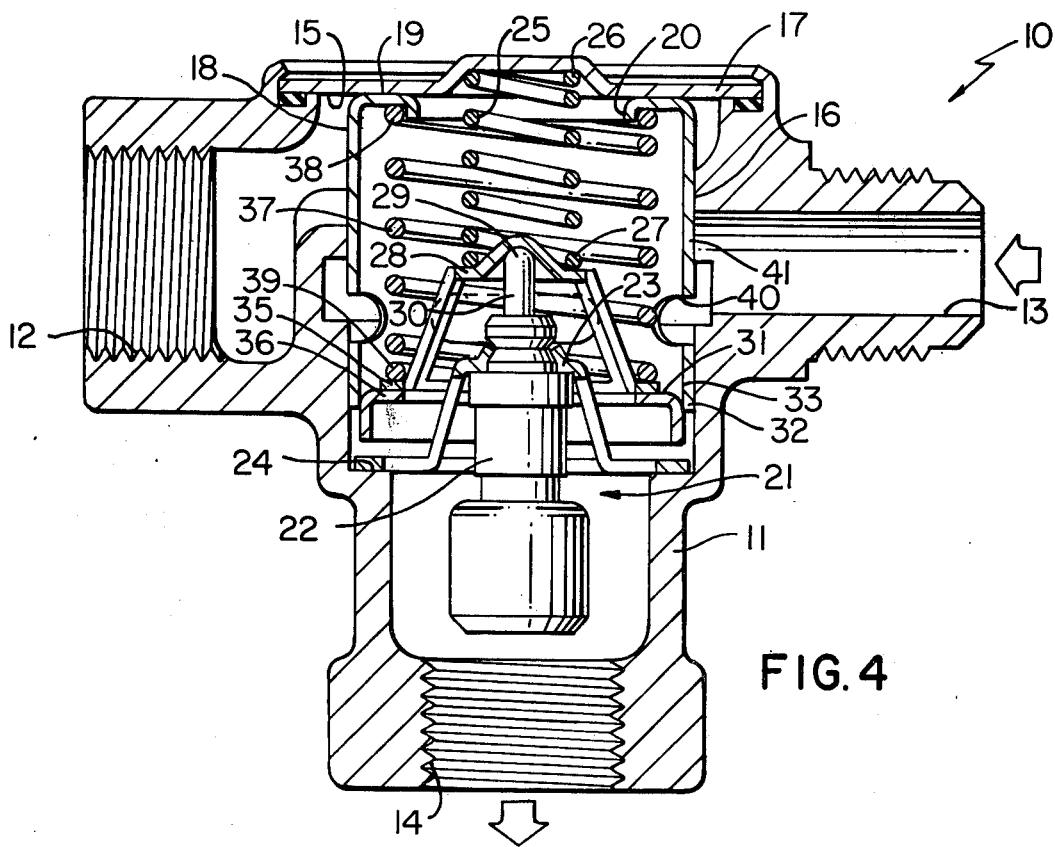
FIG. 4 is a view similar to FIG. 1 and illustrates the fluid mixing valve construction of FIG. 1 in a fail-safe condition thereof.

Therefore, it can be seen that the water mixing valve construction 10 of this invention is substantially fail-safe in that the first condition responsive unit 21 normally tends to maintain the temperature of the fluid passing out of the outlet 14 from exceeding a certain predetermined temperature and the second condition responsive means 34 of this invention acts as a back-up to the first condition responsive means 21 so that if the first condition responsive means 21 does not close the valve member 18 against the valve seat 15 when the temperature of the water at the outlet 14 reaches a certain temperature, the second condition responsive means 34 will, after the aforementioned time lag, cause the valve member 18 to close the valve seat 15 and thereby prevent hot water from the inlet 12 from passing to the outlet 14 as illustrated in FIG. 4, the failure of the first condition responsive unit 21 normally occurring due to constant cycling of the piston and internal diaphragm member thereof.

While one form of a backup condition responsive means 34 is provided for the water mixing valve construction 10 of FIGS. 1-4, it is to be understood that other backup condition responsive means can be utilized in addition to or in lieu of the condition responsive means 34 to cause the valve member 18 to close the hot water inlet 12 should the first condition responsive means 21 fail.

For example, another fluid mixing valve construction of this invention is generally indicated by the reference numeral 10A in FIGS. 5 and 6 and parts thereof similar to the fluid mixing valve construction 10 of FIGS. 1-4 are indicated by like reference numerals followed by the reference letter "A".

As illustrated in FIGS. 5 and 6, the fluid mixing valve construction 10A includes another temperature responsive unit 41 similar to the temperature responsive unit 21A but disposed upside down relative thereto so that the cylinder 42 of the unit 41 is in direct engagement against the cylinder 22A of the first unit 21A while the piston 43 of the backup unit 41 is disposed against a bridging member 44 of the housing means 11A.

A push-on type of retainer 45 is carried by the cylinder 42 of the unit 41 and prevents the cylinder 41 from retracting after the unit 41 is activated. In particular, the retainer 45 has one-way locking washer-like inner periphery 46 that engages piston 43 of the unit 41 so that when the unit 41 is activated by sensing a certain temperature the cylinder 42 extends relative to the piston 43 and carries the retainer 45 upwardly in FIGS. 5-7 relative thereto. However, when the unit 41 subsequently cools, the cylinder can not retract relative to the piston 43 because the inner periphery 46 of the retainer 45 locks with the piston 43 to prevent the cylinder 42 and piston 43 from coming toward each other for a purpose hereinafter described.

In this manner, should the temperature responsive unit 21A fail to cause the valve member 18A to close the valve seat 15A when the temperature of the fluid in the outlet 14A exceeds a predetermined temperature and after the aforementioned time lag has lapsed, the second temperature responsive unit 41 when sensing an unsafe temperature in the outlet 14A, such as the 160° F. previously mentioned, the piston 43 of the unit 41 tends to extend and thereby causes the cylinder 42 to move upwardly relative to the bridge 44 and thereby carry upwardly therewith not only the first temperature responsive unit 21A, but also move the valve member 18A upwardly therewith in opposition to the force of the compression spring 25A to cause the valve member 18A to close against the valve seat 15A and thereby prevent the hot water inlet 12A from being interconnected to the outlet 14A as illustrated in FIG. 6.

Because the retainer 45 is now holding the unit 41 in the position of FIG. 6, the valve construction 10A can only deliver cold water until the construction 10A is repaired by replacing the failed element 21A as well as the one-time fail-safe element 41. This requirement prevents cycling and controlling from the fail-safe element 41.

Also, the unit 41 does not cycle under ordinary conditions of the valve construction 10A because the temperature responsive media (wax) thereof has little expansion at the normal operating temperature of the unit 21A. However, at the fail-safe temperature, the media (wax) of the unit 41 has a large expansion resulting in the closing of the hot water port 12A as previously described. Thus, the temperature-movement conditions of the valve construction 10A can be varied as required by selecting the proper wax formula for the unit 41 as well as for the unit 21A.

Thus, it can be seen that in the embodiment of the fluid mixing valve construction 10A of FIGS. 5 and 6, should the first temperature responsive unit 21A fail, the second temperature responsive unit 41A causes the closing of the valve seat 15A to render the fluid mixing valve construction 10A substantially fail-safe and thereby prevent a scalding condition at the outlet 14A in a manner similar to the condition responsive means 34 of the fluid mixing valve construction 10 of FIGS. 1-4.

Of course, the condition responsive means 34 can also be utilized in the valve construction 10A as a third backup so that should the backup temperature responsive means 41 also fail, the overrun spring 37A could be utilized to cause the valve member 18A to close the valve seat 15A in the manner previously described for the fluid mixing valve construction 10 of FIGS. 1-4.

Therefore, it can be seen that this invention not only provides an improved fluid mixing valve construction that is rendered substantially fail-safe, but also this invention provides an improved method of making such a fluid mixing valve construction.

While the forms and methods of this invention now preferred have been illustrated and described as required by the Patent Statute, it is to be understood that other forms and method steps can be utilized and still fall within the scope of the appended claims.

What is claimed is:

1. In a fluid mixing valve construction having a housing means provided with a pair of inlets respectively interconnected by a pair of valve seats to an outlet and with valve member means operated by condition responsive means for controlling said valve seats in accordance with the condition of the fluid passing to said outlet and sensed by said condition responsive means, a second condition responsive means being operatively interconnected to said valve member means to close one of said valve seats with said valve member means if the first-mentioned condition responsive means does not close the one valve seat with said valve member means even though the same is sensing a condition that would require the same to close said one valve seat, the improvement wherein said second condition responsive means acts directly on said first-mentioned condition responsive means to move said first-mentioned condition responsive means and said valve member means relative to said housing means to close said one valve seat if said first-mentioned condition responsive means does not close said one valve seat with said valve member means even though the same is sensing a condition that would require the same to close said one valve seat.

2. A fluid mixing valve construction as set forth in claim 1 wherein said condition responsive means each comprises a piston and cylinder temperature responsive unit.

3. In a method of making a fluid mixing valve construction having a housing means provided with a pair of inlets respectively interconnected by a pair of valve seats to an outlet and with valve member means operated by condition responsive means for controlling said valve seats in accordance with the condition of the fluid passing to said outlet and sensed by said condition responsive means, a second condition responsive means being operatively interconnected to said valve member means to close one of said valve seats with said valve member means if the first-mentioned condition responsive means does not close the one valve seat with said valve member means even though the same is sensing a condition that could require the same to close said one valve seat, the improvement comprising the step of disposing said second condition responsive means to act directly on said first-mentioned condition responsive means to move said first-mentioned condition responsive means and said valve member means relative to said housing means to close said one valve seat if said first-mentioned condition responsive means does not close said one valve seat with said valve member means even though the same is sensing a condition that would require the same to close said one valve seat.

4. A method of making a fluid mixing valve construction as set forth in claim 3 and including the step of forming each of said condition responsive means from a piston and cylinder temperature responsive unit.

* * * * *